United States Patent
Barry et al.

(10) Patent No.: US 6,772,454 B1
(45) Date of Patent: Aug. 10, 2004

(54) TOILET TRAINING DEVICE

(76) Inventors: Gregory Thomas Barry, 15652 Sunflower La., Huntington Beach, CA (US) 92647; Thomas Jackson Barry, 15652 Sunflower La., Huntington Beach, CA (US) 92647

( * ) Notice: Subject to any disclaimer, the term of this patent is extended or adjusted under 35 U.S.C. 154(b) by 0 days.

(21) Appl. No.: 10/401,917

(22) Filed: Mar. 28, 2003

(51) Int. Cl.⁷ .................................................. E03C 1/33
(52) U.S. Cl. ............................................... 4/661; 4/902
(58) Field of Search ..................... 4/661, 902; 340/604, 340/605

(56) References Cited

U.S. PATENT DOCUMENTS

| | | | |
|---|---|---|---|
| 2,075,308 A | | 3/1937 | Simonsen |
| 2,361,677 A | | 10/1944 | Bramhall |
| 2,703,407 A | * | 3/1955 | Henoch et al. ............... 4/661 |
| 2,766,716 A | | 10/1956 | Mackey |
| 3,020,528 A | | 2/1962 | Swanson, Jr. |
| 3,680,151 A | | 8/1972 | Boardman |
| 4,044,405 A | * | 8/1977 | Kreiss .......................... 4/661 |
| 4,162,490 A | | 7/1979 | Fu |
| 4,707,870 A | * | 11/1987 | Glassco et al. ............... 4/661 |
| 5,008,964 A | | 4/1991 | Dean |
| 2,699,139 A | | 1/1995 | Mackey |
| 5,537,695 A | | 7/1996 | Ander |
| 5,560,051 A | | 10/1996 | Butts |
| 5,870,015 A | * | 2/1999 | Hinkel .......................... 4/661 |
| 5,890,242 A | | 4/1999 | Minter |
| 5,893,178 A | | 4/1999 | Wosiek |
| 5,894,611 A | * | 4/1999 | Toro ............................. 4/661 |
| 6,028,520 A | | 2/2000 | Maehre |

FOREIGN PATENT DOCUMENTS

| | | | |
|---|---|---|---|
| EP | 0914793 A1 | 12/1999 | |
| JP | 08000502 A | * 1/1996 | .......... A47K/13/24 |
| WO | WO94/17691 | 8/1994 | |

* cited by examiner

Primary Examiner—Tuan N. Nguyen
(74) Attorney, Agent, or Firm—Eric Karich

(57) ABSTRACT

A toilet training device has a target sensor for sensing an impact of urine, a first suction cup for securing the target sensor to a toilet, a music box for providing a feedback, and an insulated electric wire for connecting the target sensor with the music box. The target sensor can be positioned unobtrusively within the toilet. When a user urinates, the target sensor detects an impact of the urine when hit, and the target sensor triggers music in the music box through the insulated electric wire.

9 Claims, 2 Drawing Sheets

TOILET TRAINING DEVICE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates to toilet training devices, and more particularly to an electronic training device with audible and/or visible feedback means activated when a child hits with a urine stream a sensing means for making toilet training fun and exciting for the child.

2. Description of Related Art

Toilet training children can be quite difficult especially when teaching a male child to urinate. The parent's biggest challenge is to persuade their child to use the toilet when they need to urinate. The next biggest challenge is to teach the child, particularly boys, to sanitarily use the toilet. Therefore, a toilet training apparatus should merge amusement and fin with instructional value into one simple to use device.

Various prior art patents describe targets of various sorts that are used to direct a male in where to urinate. Kreiss, U.S. Pat. No. 4,044,405, teaches a target that is designed to be fixedly attached on a rigid arm, to a urinal or toilet. Lauer, U.S. Pat. No. 6,183,850, teaches a water-dispersible foam polymer target that floats in a toilet or rests in a urinal. Henoch et al., U.S. Pat. No. 2,703,407, teaches a spinner-target that is attached to a toilet with a rigid mounting structure; and includes a swing arm that supports the target.

In addition to targets, the prior art also discloses the use of electronic fluid detection systems for detecting urination and responding with a musical reward. Examples include Fu et al., U.S. Pat. No. 4,162,490 discloses a toilet training device having a non-contact electrical sensor to detect urine and audio and visual rewards; Butts, U.S. Pat. No. 5,560,051 discloses a sound generating toilet training device; and Dean et al., U.S. Pat. No. 5,008,964 discloses a child's toilet with automatic speech and tune producing capability.

Various other devices are described in additional references, including: Bramhall, U.S. Pat. No. 2,361,677 which discloses an elongated member to be secured to a toilet seat with the free end sustained within the toilet bowl and a signal means responsive to the movement of said member to produce an audible signal; and Simonsen, U.S. Pat. No. 2,075,308 which discloses an appliance for securing to a toilet seat containing a signal device, an actuator extending into the toilet bowl, and weight-responsive means carried by the actuator. These prior art devices have to be secured to a toilet seat, and, due to their presence, limit the normal use of a toilet.

An electronic toilet training device with audible feedback means is disclosed in Minter, U.S. Pat. No. 5,890,242. Minter teaches an electronic toilet training apparatus that includes a rigid support frame that supports a rotatable target. The rotatable target triggers an audible rewarding system when the child strikes the target. Also the position of these devices cannot be chosen freely but have to be placed on predetermined places on the edge of the toilet bowl and therefore limit the normal use of a toilet with this training device placed on it.

The above-described references are hereby incorporated by reference in full.

The prior art teaches various targets to training children how to urinate, and the prior art also teaches various musical devices that reward urination with music. However, the prior art does not teach a target that is adapted to be operably positioned within a toilet and electronically attached to a musical generator with a flexible insulated wire. The present invention fulfills these needs and provides further related advantages as described in the following summary.

SUMMARY OF THE INVENTION

The present invention teaches certain benefits in construction and use which give rise to the objectives described below.

The present invention provides a toilet training device that can be operably positioned in a toilet for sensing the urination of a person, most commonly a small male child. The toilet training device has a target sensor for sensing an impact of urine, a first suction cup for securing the target sensor to a toilet, a music box for providing a feedback, and an insulated electric wire for connecting the target sensor with the music box. The target sensor can be positioned unobtrusively within the toilet. When a user urinates, the target sensor detects an impact of the urine when hit, and the target sensor triggers music in the music box through the insulated electric wire.

A primary objective of the present invention is to provide a toilet training device having advantages not taught by the prior art.

It is another object of the present invention to provide a toilet training device having, a sensing means for sensing an impact of urine, a feedback means for providing a feedback, and a flexible connecting means that connects the sensing means with the feedback means such that the toilet training device can be operably installed in a toilet bowl or urinal without obstruction the normal use of the toilet or urinal.

It is a further object of the present invention to provide a toilet training device having a sensor that can easily be mounted on any chosen place on the toilet or urinal, and also easily moved, or removed for cleaning.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a toilet training device 1 that includes a sensing means 3 that can be operably positioned in a toilet 2 for sensing the urination of a person, most commonly a small male child.

Figure 1:
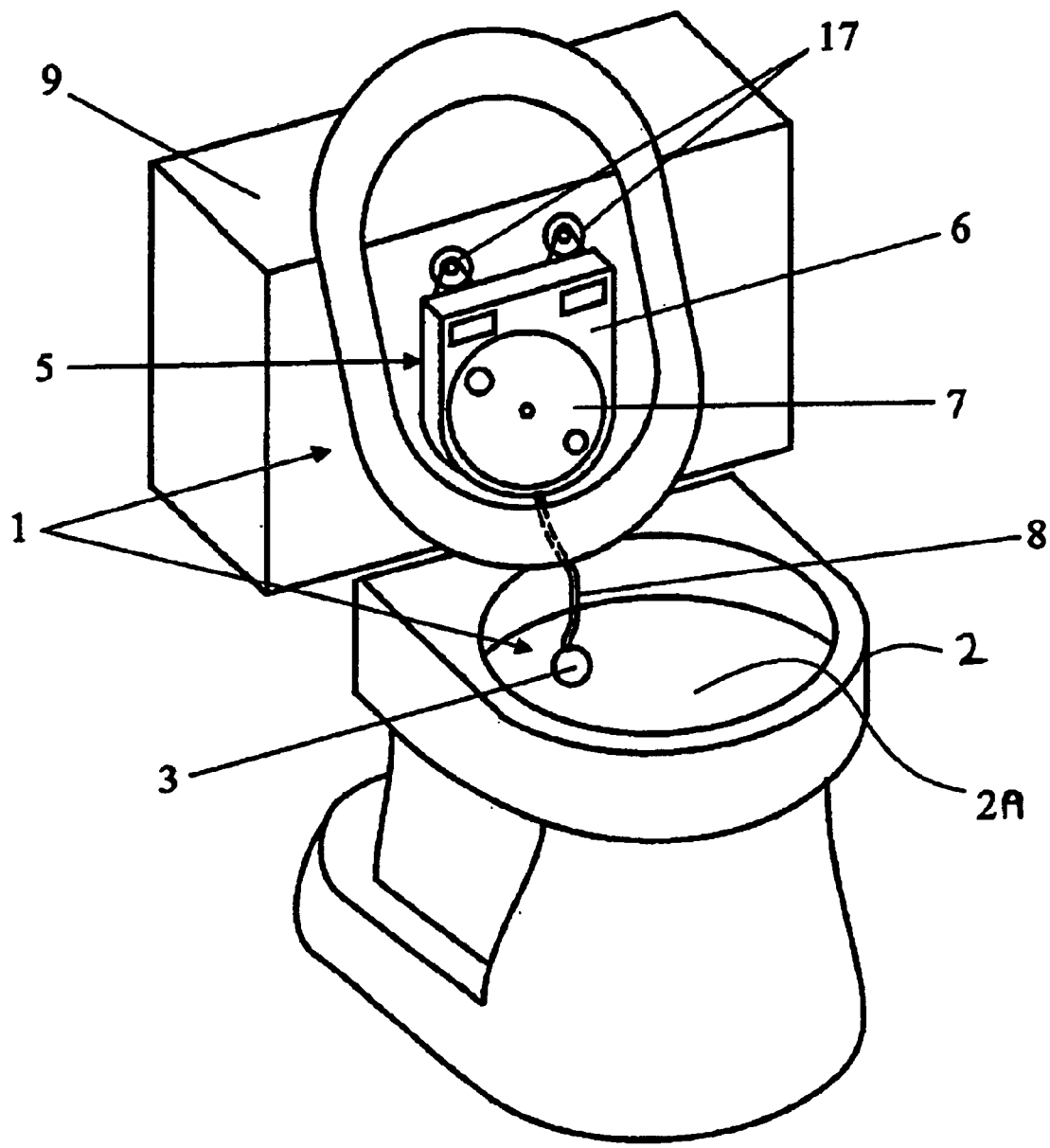
FIG. 1 shows a perspective view of a first embodiment of the toilet training device of the present invention secured to a toilet and having a music box and spinning wheel as a feedback means.

FIG. 1 shows a first embodiment of the toilet training device 1 of the present invention secured to a toilet 2. The toilet training device 1 has a sensing means 3 for sensing an impact of urine and is secured inside the toilet 2. The sensing means 3 is, in this embodiment, a piezoelectric sensor which serves as a target. In alternative embodiments, the sensing means 3 may also be a pressure sensor, a fluid sensor, strain gauge, or any other form of similar or equivalent sensor device.

Figure 2:
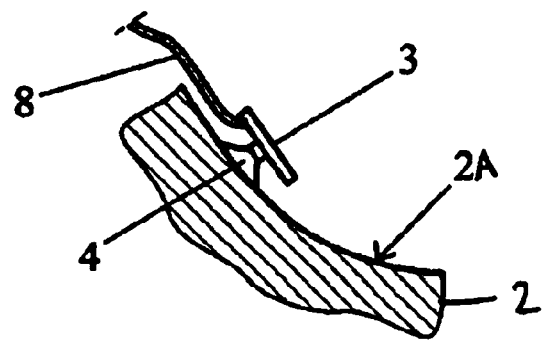
FIG. 2 shows a sectional view of the target sensor, illustrating how the target sensor attached to the toilet with a first suction cup.

The sensing means 3 further includes a means for removably mounting the sensing means 3 to an inner surface 2A of in the toilet 2. In one embodiment, as shown in FIG. 2, the means for removably mounting is a first suction cup 4 that enables the sensing means 3 to be attached direly to the inner surface 2A of the toilet 2. In alternative embodiments, however, the means for removably mounting could be provided by a suitable adhesive, VELCRO®, double sided adhesive tape, or a weighted/shaped base (not shown) that is adapted to operably position the sensing means 3 within the toilet 2.

The toilet training device 1 further has a feedback means 5 for providing a audio and/or visual feedback such as music, flashing lights, spinning wheels, or other similar feedback. In one embodiment, the feedback means 5 is an audio means producing an audible signal when activated. In another embodiment, the feedback means 5 is a visual means producing a visible signal when activated. In the present embodiment, the feedback means 5 is designed as a music box 6 and a wheel 7. The music box 6 starts to play music and the wheel 7 starts to spin when the sensing means 3 detect an impact of urine. For energizing and operably controlling the music box 6 and the wheel 7 the feedback means 5, the feedback means 5 includes circuitry, a processor, and batteries (not shown) inside its housing; however, since such elements are well understood in the art, they are not described in greater detail herein.

The feedback means 5 is adapted to be positioned on or adjacent to the toilet 2. In one embodiment, the feedback means 5 includes a means for mounting the feedback means 5 on a toilet back 9 of the toilet 2. In the preferred embodiment, the means for mounting is a second suction cup 17 (or pair of suction cups, as shown). In an alternative embodiment, the means for mounting may be a suitable adhesive, VELCRO®, double sided adhesive tape, an elastic band or flexible material shaped to fit over and/or around the toilet back 9 or otherwise attached to the toilet 2 or the wall adjacent the toilet 2. The feedback means 5 may also be positioned adjacent the toilet 2, resting on the floor. Those skilled in the art can devise many alternative structures, and these and other similar or obvious alternatives should be considered within the scope of the present invention.

The sensing means 3, is connected to the feedback means 5 by on a flexible connecting means 8. In the present embodiment, the flexible connecting means 8 is an insulated electric wire. The flexible connecting means 3 may also be provided with another form of cable, wire, or similar connector, as long as it is of a suitable length and flexibility and is capable of transmitting a signal from the sensing means 3 to the feedback means 5. Those skilled in the art can devise many alternative structures, and these and other similar or obvious alternatives should be considered within the scope of the present invention.

The flexible connecting means 8 allows placement of the sensor anywhere in the toilet 2 without causing any interference with the ordinary use of the toilet 2. The sensing means 3 is small enough to not interfere with the use of the toilet 2 by adults; and the flexible connecting means 8 does not interfere with the use of the toilet 2, or the raising or lowering of the toilet seat This allows the toilet training device 1 to be installed semi-permanently without interfering with the routine use of the toilet 2 by others. When the small child uses the toilet 2, and his urine hits the sensing means 3, he is rewarded with music from the music box 6 and the spinning of the wheel 7.

Figure 3:
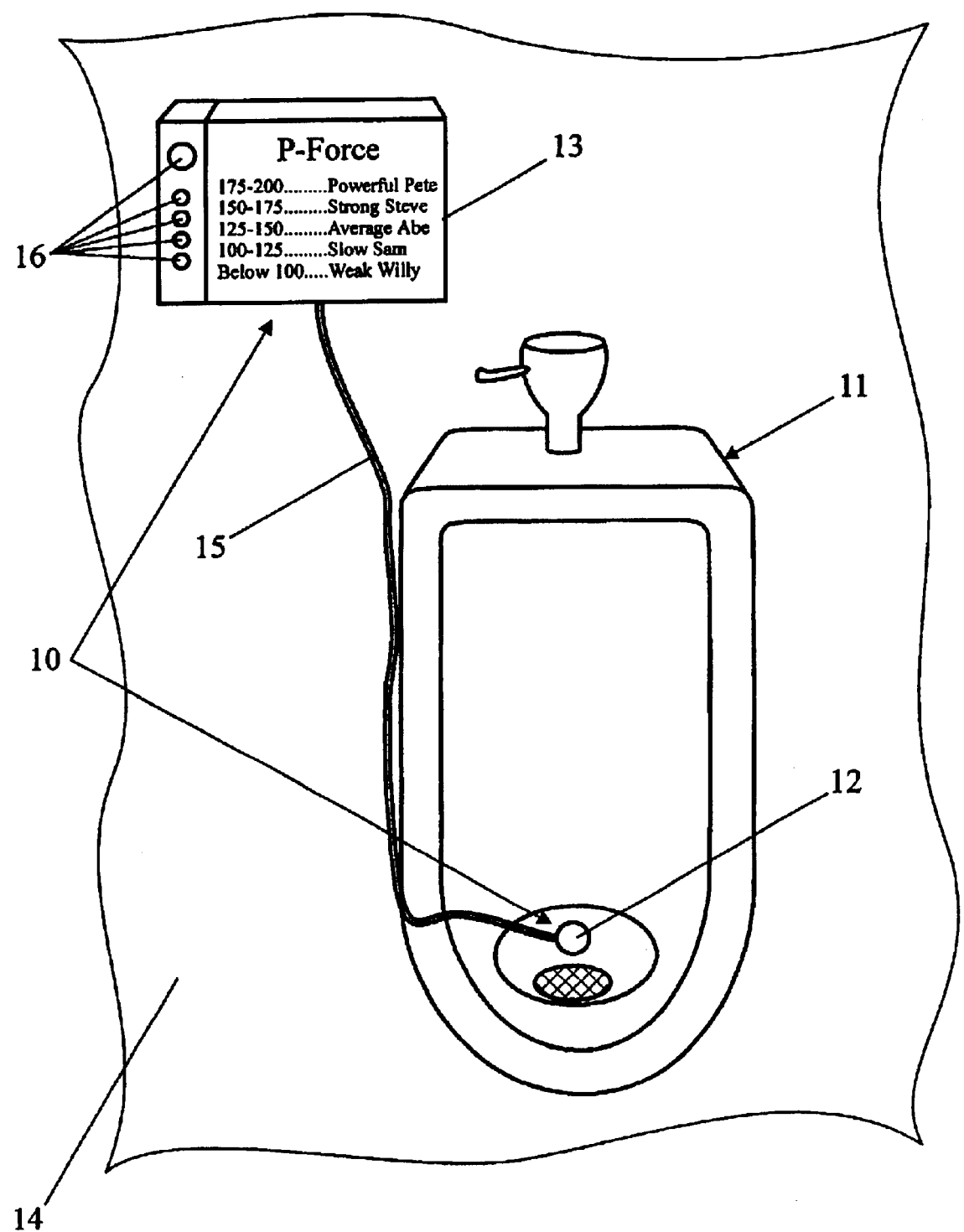
FIG. 3 shows a perspective view of a second embodiment of the toilet training device of the present invention secured to an urinal and having a display as a feedback means.

FIG. 3 shows a second embodiment of the toilet training device 10 of the present invention installed on a urinal 11. In this alternative embodiment, the sensing means 12 measures the force of the urination. In this embodiment, the feedback means 5 does not provide a reward, but instead reports the force of the impact of the urine. The force is displayed on feedback means 13. In this embodiment, the feedback means 5 is preferably attached to a wall 14 with a double sided adhesive tape, screws, or similar or equivalent attachment means (not shown). So with this toilet training device 10 the user can compare his force with the score of other people on the display. Also in this embodiment the sensing means 12 is connected to the feedback means 13 by a flexible electric wire which forms the connecting means 15.

In this embodiment, the feedback means 13 preferably includes a plurality of LEDs 16. The plurality of LEDs 16 are illuminated, in sequence, to display an amount of force. For example, a weak force would only illuminate the lowest of the plurality of LEDs 16; a stronger force would illuminate 2–4 of the plurality of LEDs 16; and the strongest force would illuminate all of the plurality of LEDs 16. Of course, those skilled in the art can devise many alternative displays, which could also include audio and/or visual feedback, recordings, or even prizes if desired.

While the invention has been described with reference to at least one preferred embodiment, it is to be clearly understood by those skilled in the art that the invention is not limited thereto. Rather, the scope of the invention is to be interpreted only in conjunction with the appended claims.

All patents, patent applications, and other documents and printed matter cited or referred to in this application is hereby incorporated by reference in full.

What is claimed is:

1. A toilet training device for use with a toilet, the toilet training device comprising:
    a sensing means for sensing an impact of urine;
    a suction cup for securing the sensing means in the toilet by attaching the suction cup to an inner surface of the toilet;
    a feedback means for providing a feedback; and
    a connecting means that connects the sensing means with the feedback means, which connecting means are flexible,
    the sensing means being connected to the feedback means only with the flexible connecting means.

2. The toilet training device of claim 1, wherein the connecting means is only an insulated wire.

3. The toilet training device of claim 1, further comprising means for securing the feedback means on or adjacent to the toilet.

4. The toilet training device of claim 1, wherein the feedback means is an audio means producing an audible signal when activated.

5. The toilet training device of claim 1, wherein tho feedback means is a visual means producing a visible signal when activated.

6. The toilet training device of claim 1, wherein the sensing means is a piezoelectric sensor.

7. A toilet training device for use with a toilet, the toilet training device comprising,
- a sensing means for sensing an impact of urine;
- a suction cup operably attached to the sensing means, the suction cup being adapted for securing the sensing means to an inner surface of the toilet;
- a feedback means for providing a feedback; and
- an insulated wire that operably connects the sensing means with the feedback means, which insulated wire is flexible,
- the sensing means being connected to the feedback means only with the flexible connecting means.

8. The toilet training device of claim 7, further comprising means for securing the feedback means on or adjacent to the toilet.

9. A method of training a young male child to use a toilet, the method comprising the steps of:
- a) providing a toilet training device comprising:
  - a sensing means for sensing an impact of urine;
  - an insulated wire, the insulated wire being flexible; and
  - a feedback means for providing a feedback;
- b) securing the sensing means to an inner surface of the toilet via suction cup;
- c) positioning the insulated wire on the toilet so that the insulated wire does not interfere with the routine use of the toilet; and
- d) connecting the sensing means to the feedback means using only the insulated wire.

* * * * *